UNITED STATES PATENT OFFICE.

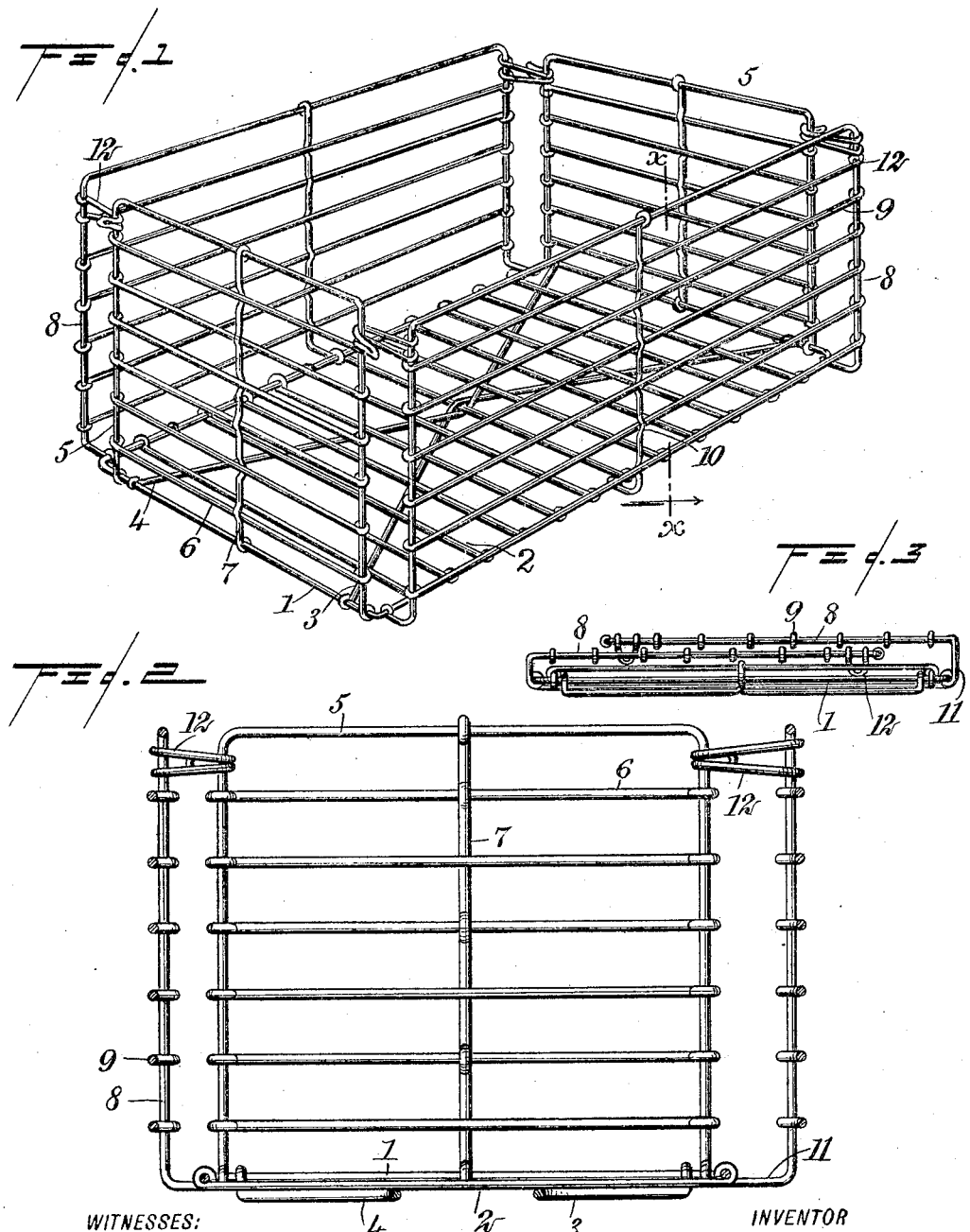

FRANK W. SMITH, OF YALE, MICHIGAN.

FOLDING CRATE.

No. 797,871. Specification of Letters Patent. Patented Aug. 22, 1905.

Application filed February 21, 1905. Serial No. 246,695.

*To all whom it may concern:*

Be it known that I, FRANK W. SMITH, a citizen of the United States, and a resident of Yale, in the county of St. Clair and State of Michigan, have invented a new and Improved Folding Crate, of which the following is a full, clear, and exact description.

This invention relates to improvements in wire crates designed for use in the transportation of vegetables and other produce, the object being to provide a crate that will be light yet strong in construction and that may be compactly folded for reshipment or storage.

I will describe a folding crate embodying my invention and then point out the novel features in the appended claims.

Reference is to be had to the accompanying drawings, forming a part of this specification, in which similar characters of reference indicate corresponding parts in all the figures.

Figure 1 is a perspective view of a crate embodying my invention. Fig. 2 is a section on the line $x\,x$ of Fig. 1, and Fig. 3 is an end view showing the crate as folded.

The bottom of the crate is formed with a rectangular frame 1, which consists of wire, and connecting with the longer or side members of the frame are wires 2, and the bottom is braced by crossed wires 3 4, which are connected to the end members of the frame 1 and at about the center interlock with one of the crossed wires 2. As clearly indicated in the drawings, these wires 3 4 are engaged one over the crossed wire 2 and the other underneath the same.

Mounted to swing on the end members of the frame 1 are wire end walls, each consisting of a frame 5, to the end members of which crossed wires 6 are secured by bending the ends of said crossed wires around the end members of the frame. The hinge connection between the frame 5 and the frame 1 is formed by bending the ends of the end members of the frame 5 around the end members of the bottom frame, and these ends are braced by wires 7, connected at the top to the top members of the end frame and at the lower end to the end members of the bottom frame, so as to turn thereon, and these wires 7 engage the crossed wires 6 alternately at the outer and inner sides.

The side portions of the crate consist of wire frames 8, the end portions of which have hinge connection with the side members of the bottom frame, these hinge connections being formed by turning the ends of the wires 8 around the side wires of the bottom frame.

Connecting with the end members of the side frames are wires 9, and engaging alternately with the inner and outer sides of the wires 9 are brace-wires 10, the upper ends of which are turned around the upper members of the side frames and the lower ends are turned around the side members of the bottom frame, so as to turn thereon. It will be noted that the lower ends of the end portions of the side frames are turned inward at substantially right angles to the plane of the side frames and that the inwardly-turned portions at one side are somewhat longer than the inwardly-turned portions at the opposite side, as indicated at 11. This permits said opposite side to be turned down upon the end frames when said end frames are folded onto the bottom of the crate, and then the side having the longer extensions 11 may be folded down upon the opposite side. When the parts are in position for use, they are held securely together by means of hooks 12, which are arranged to swing, as here shown, on the side frames and engaged with the end frames.

Having thus described my invention, I claim as new and desire to secure by Letters Patent—

1. A crate comprising a bottom frame of wire, crossed wires connecting with the side members of said frame, crossed braces connecting with the end members of said frame and also engaging with one of said crossed wires so as to interlock therewith, end frames consisting of wire having swinging connection with the end members of the bottom frame, crossed wires connecting with the end members of the end frames, brace-wires engaging with said crossed wires alternately at the inner and outer sides and having their lower ends bent around the end members of the bottom frame, side frames having the lower ends of the end portions of the frames bent inward and around the side members of the bottom frame, the inwardly-bent portions of one frame being longer than those of the other frame wires engaging with the end members of said side frames, braces engaging alternately with the inner and outer sides of said wires and having their lower ends bent inwardly and around the side members of the bottom frame, and hooks mounted to swing on the side frames and adapted for engagement with the end frames.

2. A crate comprising a wire bottom frame, wires connecting the side members of said bottom frame, end frames mounted to swing on the end members of the bottom frame, side frames having inward extensions at the lower ends of their end members, the said inward extensions being bent around the side members of the bottom frame, and the extensions of one side frame being longer than the extensions of the opposite side frame.

3. A crate, comprising a bottom frame having cross-wires, end frames having the lower ends of the end members bent around the end members of the bottom frame, and each having cross-wires and a vertical brace engaging the cross-wires alternately, and having its lower end bent around the end member of the bottom frame, and side frames having the lower ends of the end members bent around the side members of the bottom frame and each provided with connecting-wires and with a vertical brace alternately engaging the connecting-wires and having its lower end bent around the side member of the bottom frame.

In testimony whereof I have signed my name to this specification in the presence of two subscribing witnesses.

FRANK W. SMITH.

Witnesses:
STEPHEN WINDSOR,
WILLIAM H. BALLENTINE.